Sept. 16, 1969  J. L. VARGAS  3,467,445

FAIL-SAFE HYDRAULIC BRAKE SYSTEM

Filed Dec. 29, 1967

INVENTOR

José LEAL VARGAS

BY *Stephen H. Frishauf*

ATTORNEY

United States Patent Office 3,467,445
Patented Sept. 16, 1969

3,467,445
FAIL-SAFE HYDRAULIC BRAKE SYSTEM
José Leal Vargas, Hermosilla 96, Madrid (9), Spain
Filed Dec. 29, 1967, Ser. No. 694,735
Claims priority, application Spain, Jan. 9, 1967, 335,389
Int. Cl. B60t 15/46, 11/10
U.S. Cl. 303—84     3 Claims

ABSTRACT OF THE DISCLOSURE

The improvements which are the subject of the present invention have as their purpose the obtaining of greater security against the loss of pressure in hydraulic circuits for operating brake-pumps, and also that of achieving greater pressure in the said pumps.

The general hydraulic circuit of the automobile is divided into two parts which are independent in the sense that, although they are connected to a common pump, there is no intercommunication of liquid between the said two parts. By means of such arrangement the loss of pressure in one of the circuits, caused, for example, by failure of a pipe, does not give rise to the loss of liquid in the whole system, as occurs in existing systems, but simply causes the operation of the pumps corresponding to the said circuit to cease, for example, those corresponding to the rear wheels or the front wheels, so that only a 50 percent loss of effectiveness in the braking system is produced.

---

The present invention consists essentially in endowing the hydraulic system with a pump which includes a pressure chamber connected directly with two cylinders, each of which is coupled to one of the parts of the hydraulic circuit. In each cylinder there is housed a free piston which acts as a floating separator between the hydraulic liquid contained in the interior of the brake pump and the hydraulic liquid enclosed in each one of the systems, so that there is a transmission of pressure between the generating system and the receiving circuits and a hermetic seal in the case of the loss of pressure in either of the two said circuits.

Consequently, the distribution of pressure indirectly to the brake-shoe pumps, is attained creating two independent brake circuits, and avoiding, on a failure being produced, the vehicles being left without braking power at the most critical moment, thus considerably reducing the risk of a grave accident. Likewise, the invention makes it possible to increase the action of the brake by super-pressure, which is originated in its interior.

With the aim of enabling the invention to be better interpreted, in the annexed drawing, complementary to the present exposition, a practical form of its industrial embodiment is represented, which form, is included merely by way of example, and not as a limitation; of the inventive concept disclosed herein.

In the said drawings, FIGURE 1 shows a plan view, with a longitudinal section of one part, of a brake-pump endowed with the improvements in accordance with the invention.

As is shown in the said figures, the pump (K), of known dimensions and construction, is comprised of two lateral cylindrical bodies connected to one another through an intermediate chamber (J) for expansion of the liquid, which communicates with two cylindrical cavities (A) situated in the same geometrical axis and perpendicular to the axis of the cylinder of the pump (K).

The said chambers (A), or cylindrical cavities, communicate with the body of the pump (K) through the respective ducts (B) whose outlets are situated at the outlet end of each of the cylindrical chambers (A), which ducts are equipped with respective valve (D).

The expansion chamber (J) is equipped with a stopper, constituted by the bleed screw (C). The ends of both cylinders (A) are equipped with threaded couplers (I) for the coupling of the respective ducts of each brake circuit, each of which circuits, as has already been indicated, corresponds to a pair of wheels, front or rear.

In the interior of each cylinder there is housed a floating piston (E) with a double head, with gaskets (F) in the form of cups against each of which there is supported a corresponding spring (G). The spring situated against the gasket (F) of the secondary head of piston (E), that is to say facing the outlet, is stronger than that which is applied to the primary head of piston (E).

Figure 1:
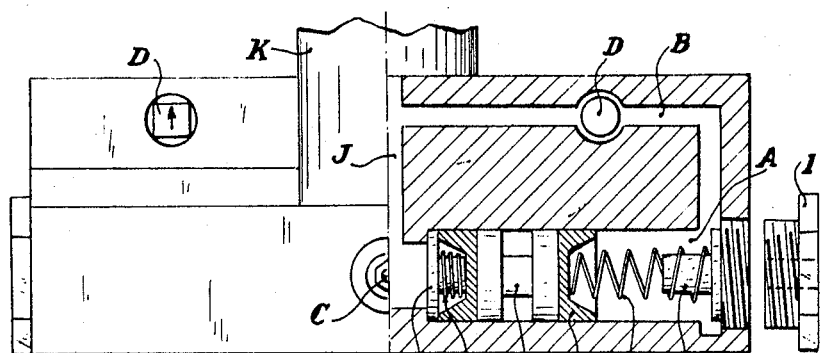
Figure 2:
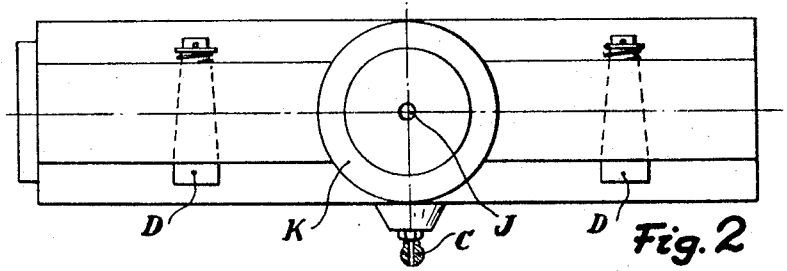
FIGURE 2 shows a view of the pump through the cylinder.
Figure 4:
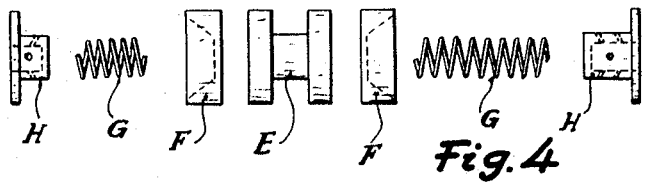
FIGURE 4 shows a lateral view of the complex of pieces constituting a floating piston.
Figure 3:
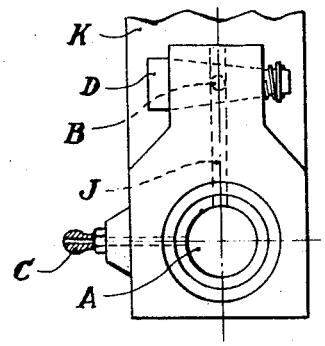
FIGURE 3 shows a lateral view of the coupling unit of one of the brake circuits.

In the interior of the said cylinders, there are likewise housed the retaining pieces (H), constituted, as may be appreciated from FIGURE 4, by small capsules in the form of a cap, equipped with orifices for the passage of the fluid.

The invention operates in the following manner: The pump (K) through the orifice (J) with the by-pass valve (D) open, sends the liquid through the couplings in the covers of the cylinders (I) to the shoe-pumps, on one side to the front wheels, and on the other to the rear wheels. Once having verified that there is no air in the hydraulic system, the by-pass valves (D) are closed, and the air is extracted from the intermediate chamber by means of the bleed screw (C), the system now being ready to operate, so that by the action of the pump (K) the liquid exercises pressure in the intermediate chamber, operating the pistons in the cylinders (A) by means of the primary head. In turn, these, by means of the secondary head, exert pressure on the liquid contained in the two circuits (front-wheel and rear-wheel), and cause a super-pressure to be produced in the shoe-pumps by indirect action of the pump on the independent circuits, the braking power being considerably increased.

On a failure being produced which affects either one of the brakes, the pressure of the train of wheels which corresponds to it will be lost, and the piston corresponding to this circuit will continue operating, but without pressure, and the piston corresponding to the non-affected circuit will continue braking perfectly.

I claim:
1. A fail-safe hydraulic brake apparatus comprising:
   a housing having two opposed cylindrical cavities therein arranged along substantially the same longitudinal axis, and a pressure chamber located between said cavities and in direct fluid communication with both of said cavities;
   means connecting the remote ends of said cylindrical cavities to a hydraulic brake system;
   a double-headed floating piston in each said cylindrical cavity;
   first means in each cavity biasing said floating piston in a rest position towards the end of said cylindrical cavities closest to said pressure chamber;
   a pair of ducts having valves therein coupling the remote end of each respective cavity with said pressure chamber;
   first stop means located at the end of each cavity closest said pressure chamber to limit the travel of said floating piston towards said pressure chamber;
   second stop means mounted at said remote ends of said cylinders to limit the travel of said floating piston, said first and second stop means being in the form of a capsule open towards the respective outlet and having small orifices formed therein for the passage of the brake fluid; and second means in each cavity biasing said piston away from said first stop means.

2. Apparatus according to claim 1 comprising an hermetically sealing gasket located at each end of each piston, the gaskets being mounted between the pistons and the respective biasing means.

3. Apparatus according to claim 1 wherein the force of said first biasing means is greater than the force of said second biasing means.

References Cited

UNITED STATES PATENTS

| 2,239,348 | 4/1941 | Wirtanen et al. |
| 2,999,362 | 9/1961 | Kinoshita. |

FOREIGN PATENTS

| 456,970 | 4/1950 | Italy. |
| 132,546 | 7/1951 | Sweden. |
| 226,590 | 8/1943 | Switzerland. |

GEORGE E. A. HALVOSA, Primary Examiner

U.S. Cl. X.R.

60—54.5; 188—151